Figure 1:
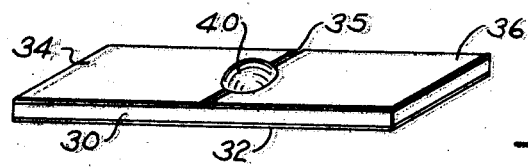

May 4, 1965 R. H. POSTAL 3,182,153
ELECTRICAL EQUIPMENT PROVIDED WITH A VISUAL INDICATOR
Filed Aug. 15, 1962 2 Sheets-Sheet 1

INVENTOR.
ROBERT H. POSTAL
BY
Roy Eilers
ATTORNEY.

May 4, 1965  R. H. POSTAL  3,182,153
ELECTRICAL EQUIPMENT PROVIDED WITH A VISUAL INDICATOR
Filed Aug. 15, 1962  2 Sheets-Sheet 2
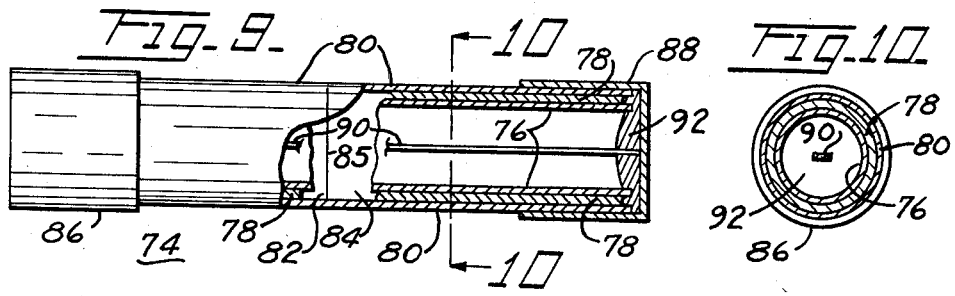
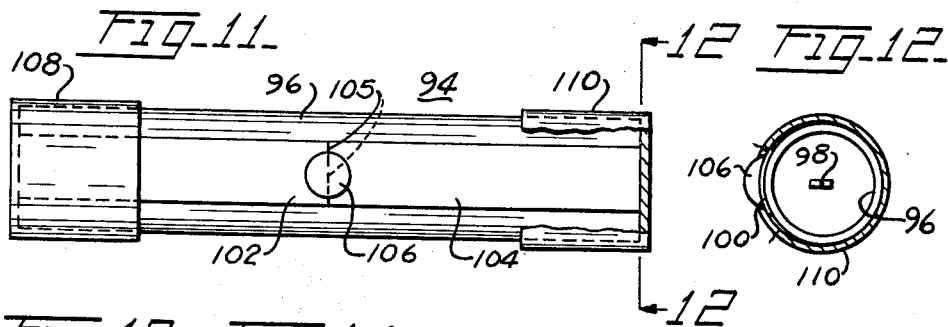
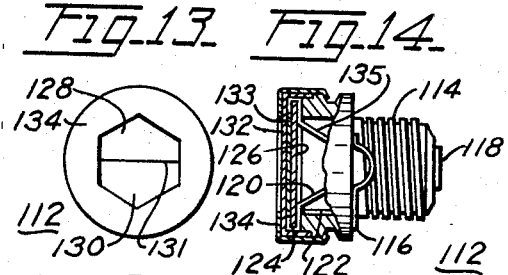
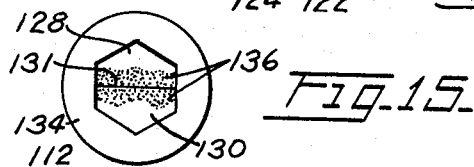
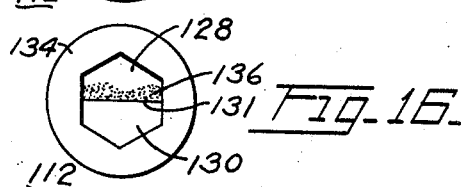
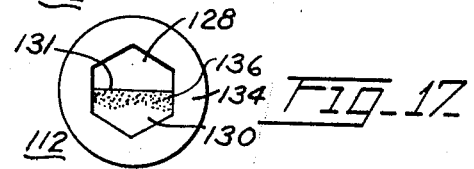
INVENTOR.
ROBERT H. POSTAL
BY
Rey Eilers
ATTORNEY.

United States Patent Office 3,182,153
Patented May 4, 1965

3,182,153
ELECTRICAL EQUIPMENT PROVIDED WITH A VISUAL INDICATOR
Robert H. Postal, Clifton, N.J., assignor to McGraw-Edison Company, Elgin, Ill., a corporation of Delaware
Filed Aug. 15, 1962, Ser. No. 217,209
13 Claims. (Cl. 200—121)

This invention relates to improvements in electrical equipment. More particularly, this invention relates to improvements in indicators for electric devices.

It is, therefore, an object of the present invention to provide an improved indicator for electric devices.

Some electric devices, as for example plug fuses and glass tube fuses, are made so the conditions of those devices can be readily determined by visual inspection of those devices. Specifically, plug fuses are made with transparent "windows" or tops, and glass tube fuses are made with transparent casings, so the conditions of the fusible elements of those fuses can be readily determined by a visual inspection of those fuses. However, other electric devices are made so the conditions of those devices can not be readily determined by visual inspection of those devices. Consequently, whenever it is desirable to determine whether such other electric devices are capable of conducting current or have "opened," it is necessary to make electrical tests to make such determinations. It would be desirable to provide an indicator which could be associated with such other electric devices and which could promptly and accurately indicate when such other electric devices "opened."

To be of maximum value, such an indicator should be inexpensive, should normally consume practically no current, should not occupy much space, should be unaffected by age, and should provide a positive and prompt indication of the "opening" of the electric device with which it is associated. The present invention provides such an indicator; and it is, therefore, an object of the present invention to provide an indicator which is inexpensive, which normally consumes practically no current, which does not occupy much space, which is unaffected by age, and which provides a positive and prompt indication of the "opening" of the electric device with which it is associated.

The indicator provided by the present invention comprises a surface which remains in the solid state as long as the electric device with which it is associated is capable of conducting current but which becomes converted to the liquid state when that electric device "opens." The appearance of the said surface, whenever it is converted to the liquid state, will be so very much different from the appearance of that surface, whenever it is in the solid state, that the instantaneous condition of that surface, and hence of the said electric device, can easily be determined by a visual examination of that surface. It is, therefore, an object of the present invention to provide an indicator that comprises a surface which remains in the solid state as long as the electric device with which it is associated is capable of conducting current but which becomes converted to the liquid state when that electric device "opens."

The surface of the indicator provided by the present invention is preferably formed as two portions which are spaced apart by a gap that is spanned by an electrolyte. That electrolyte and the material of that surface are of such a nature that the electrolyte will not convert that material from the solid state to the liquid state until after a voltage differential that exceeds a predetermined value has been established between the two portions of that surface. Further, that electrolyte and the material of that surface are of such a nature that the electrolyte will convert that material from the solid state to the liquid state as soon as such a voltage differential has been established between the two portions of that surface. The indicator will be connected in parallel with an electric device that has sufficient conductivity to keep any voltage differential, existing between the two portions of the surface of the indicator, below the said predetermined value as long as that electric device is capable of conducting current; and that electric device will be so connected in its circuit that the voltage differential, existing between the two portions of the surface of the indicator, will rise above the said predetermined value as soon as that electric device "opens." As a result, the material of the surface of the indicator will remain in the solid state as long as the electric device with which the indicator is associated is capable of conducting current but will promptly become converted to the liquid state when that electric device "opens." In this way, the surface of the indicator will remain unchanged until the electric device with which the indicator is associated "opens," and will thereafter experience a readily visible change.

Where desired, a colored mass can be overlain and concealed by the surface of the indicator, as long as that surface remains in the solid state, and can be rendered visible when that surface is converted from the solid state to the liquid state. That colored mass can be bright and colorful; and such a colored mass can be particularly helpful in facilitating prompt and full recognition of the conversion of the surface of the indicator from the solid state to the liquid state when the electric device with which the indicator is associated is mounted in a dark area. Not only would a person inspecting the indicator be able to note the change of the surface from the solid state to the liquid state but he would also be able to see a bright color. It is, therefore, an object of the present invention to provide a colored mass which can be overlain and concealed by the surface of an indicator, as long as that surface remains in the solid state, and which can be rendered visible when that surface is converted from the solid state to the liquid state.

Other and further objects and advantages of the present invention should become apparent from an examination of the drawing and accompanying description.

In the drawing and accompanying description several preferred embodiments of the present invention are shown and described but is to be understood that the drawing and accompanying description are for the purpose of illustration only and do not limit the invention and that the invention will be defined by the appended claims.

Figure 2:
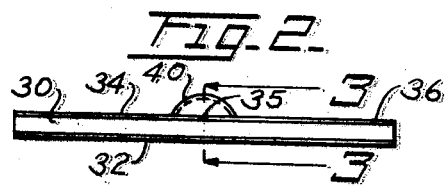
Figure 4:
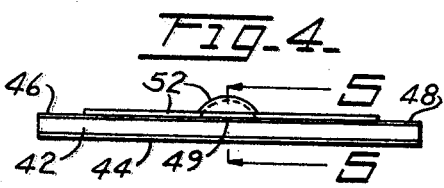
Figure 3:
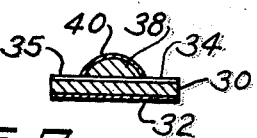
Figure 5:
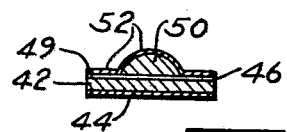
Figure 6:
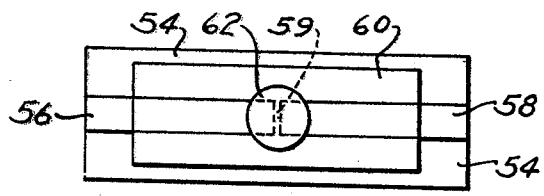
Figure 7:
Figure 8:
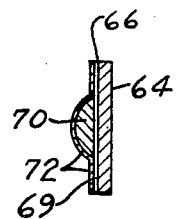

In the drawing, FIG. 1 is a perspective view of one form of indicator that is made in accordance with the principles and teachings of the present invention, FIG. 2 is a side elevational view of the indicator shown in FIG. 1, FIG. 3 is a sectional view through the indicator of FIGS. 1 and 2, and is taken along the plane indicated by the line 3—3 in FIG. 2, FIG. 4 is a side elevational view of a second form of indicator that is made in accordance with the principles and teachings of the present invention, FIG. 5 is a sectional view through the indicator of FIG. 4, and it is taken along the plane indicated by the line 5—5 in FIG. 4, FIG. 6 is a plan view of a third form of indicator that is made in accordance with the principles and teachings of the present invention, FIG. 7 is a plan view of a fourth form of indicator that is made in accordance with the principles and teachings of the present invention, FIG. 8 is a sectional view through the indicator of FIG. 7, and it is taken along the plane indicated by the line 8—8 in FIG. 7, FIG. 9 is a partially-broken-away, partially sectioned side elevational view of an electric fuse which embodies a fifth form of indicator that is made in accordance with the principles and teachings of the present invention, FIG. 10 is a sectional view through the electric fuse of FIG. 9, and it is taken along the plane indicated by the line 10—10 in FIG. 9, FIG. 11 is a partially-broken-away, side elevational view of another form of electric fuse which embodies a sixth form of indicator that is made in accordance with the principles and teachings of the present invention.

FIG. 12 is a sectional view through the electric fuse of FIG. 11, and it is taken along the plane indicated by the line 12—12 in FIG. 11, FIG. 13 is an end elevational view of a plug type electric fuse which embodies a seventh form of indicator that is made in accordance with the principles and teachings of the present invention, FIG. 14 is a partially-broken-away, partially-sectioned, side elevational view of the fuse of FIG. 13, FIG. 15 is an end elevational view of the fuse of FIG. 13, after that fuse has operated to interrupt an A.C. circuit, FIG. 16 is an end elevational view of the fuse of FIG. 13, after that fuse has operated to interrupt a D.C. circuit, and FIG. 17 is an end elevational view of the fuse of FIG. 13, after that fuse has operated to interrupt a D.C. circuit which has polarities opposite to those of the circuit of FIG. 16.

Referring to FIGS. 1–3, the numeral 30 denotes a plate-like support; and that support is preferably made from a transparent dielectric material. Some transparent dielectric materials that are particularly useful in making the support 30 are mylar, nylon, glass and acrylic plastic. While the support 30 could have different thicknesses, a thickness of from five to ten thousandths of an inch has been found to be particularly useful. Such a thickness is great enough to make the support 30 strong and rugged, but is small enough, where that support is made of plastic, to permit that support to be bent.

The numeral 32 denotes a layer of material which is affixed to the under face of the support 30; and that layer will preferably have a distinctive and readily visible color. Further, that layer will preferably be made of a material which is substantially unaffected by exposure to the air, is substantially unaffected by heat, and is substantially unaffected by age. The color that is selected should be eye-catching in the environment in which the indicator is to be used; and a chrome yellow or a bright red can be very useful.

The numeral 34 denotes one portion of a layer of conductive material that is formed on the upper face of the support 30; and the numeral 36 denotes another portion of that conductive layer. For convenience, that conductive layer can be formed as a continuous layer and then divided into the two portions 34 and 36 by using a scriber or other instrument to remove a thin strip of that conductive layer adjacent the center of that conductive layer. The resulting gap between the two portions 34 and 36 of the conductive layer is denoted by the numeral 35. Where the portions 34 and 36 of the conductive layer are formed in this manner, care should be taken during the forming of the gap 35 to remove enough of that layer to electrically isolate the portions 34 and 36 from each other.

It has been found that aluminum is a good material from which to make the conductive layer of which the portions 34 and 36 are formed; and the aluminum of that layer can be deposited on the upper face of the support 30 by evaporation or any other suitable method. The conductvie layer should be thin—preferably in the order of a few millionths of an inch—but should be thick enough to be light-opaque. The gap 35 between the portion 34 and the portion 36 will preferably have a width in the order of a few thousandths of an inch.

The numeral 38 denotes an electrolyte which is disposed in register with the gap 35 and which overlies small areas of the two portions 34 and 36 of the conductive layer. That electrolyte is transparent.

A dome-like cover 40 overlies and protects the electrolyte 38; and the bottom edges of that cover will be suitably sealed to the portions 34 and 36 of the conductive layer and to that portion of the support 30 which is exposed by the gap 35. That cover will preferably be of a transparent dielectric material such as mylar, nylon, glass or acrylic plastic. The cover 40 can be small, because only about a drop of electrolyte 38 is needed; and the cover 40 will preferably be generally concave in cross section so it can readily accommodate the electrolyte 38. The cover 40 is intended to protect the electrolyte 38 against accidental removal or displacement; and it is also intended to protect that electrolyte against drying out, exposure to the air, contamination by air-borne adulterants, and undesired changes in the composition thereof. The electrolyte 38 must be of such a nature that it will not appreciably attack the portions 34 and 36 of the conductive layer under normal conditions of operation of the indicator, but will promptly and effectively attack the portions 34 and 36 when a predetermined voltage differential is established between those portions. While a number of electrolytes could be used where the conductive layer is aluminum, some particularly useful, non-corrosive electrolytes can be made with aqueous solutions of sodium chromate, sodium dichromate, potassium nitrate, ammonium thiocyanate, or boric acid. Those aqueous solutions can readily be formed as immobilized electrolytes by mixing them with gelatin or with water-soluble gums to make a firm, clear, jell that readily conducts electricity. Where desired, humectants such as glycerine may be added to the electrolyte to prevent loss of moisture and thereby prevent shrinking of the jell.

The particular electrolyte 38 that is used should not corrode or otherwise adversely affect the metal of the portions 34 and 36 of the conductive layer, as long as there is substantially no voltage differential between those portions; and the ability of the electrolyte 38 to remain in engagement with the portions 34 and 36 of the conductive layer with substantially no effect upon those portions must be unimpaired by age or by repeated "on" cycles and "off" cycles. Furthermore, the ability of the electrolyte 38 to remain in engagement with the portions 34 and 36 of the conductive layer with practically no effect upon those portions must be unimpaired by large changes in ambient temperatures; because the indicator should be capable of being used with electric devices that are exposed to ambient temperatures throughout a range which includes very high temperatures as well as very low temperatures. As a result, it may be desirable to use a solvent other than water in forming the electrolyte. Specifically, it may be desirable to use a glycol rather than water in making the electrolyte. One very useful electrolyte that remains unchanged throughout an extremely large temperature range is a solution of boric acid and ethylene glycol or propylene glycol, to which an appropriate gum or gelatin has been added to form a semi-solid jell. Further, glycerine could be used as the solvent; and boric acid, alum, ammonium carbonate, ammonium chloride, potassium iodide, sodium tetraborate, sodium carbonate, zinc chloride or zinc iodide could be mixed with that glycerine. One particular advantage of using an electrolyte in which glycerine is the solvent is that glycerine is hygroscopic. As a result, glycerine-containing electrolytes will not dry out and experience resulting increased resistance.

In using the indicator of FIG. 1, the portions 34 and 36 will be connected to the terminals of an electric device in such a way that the indicator will be connected in parallel with that device. That electric device will normally have a sufficiently low resistance to keep the voltage differential across it, and thus across the portions 34 and 36 of the conductive layer of the indicator, at a level which is sufficiently low to keep the electrolyte 38 from acting upon the metal of the portions 34 and 36. Usually, that voltage differential will be less than one and one-half volts, because the electrolyte 38 will usually be able to start acting upon the metal of the portions 34 and 36 of the conductive layer whenever the voltage differential between those portions exceeds one and one-half volts. As a result, as long as the electric device maintains its electrical integrity, the electrolyte 38 will not appreciably affect the metal of the portions 34 and 36 of the conductive layer. However, if that electric device should "open" the circuit, the voltage differential between the portions 34 and 36 of the conductive layer would increase to a value well above the value at which the electrolyte will begin to act upon the metal of those portions. Thereupon, that electrolyte will interact with the metal of the portions 34 and 36 of the conductive layer to convert that metal from the solid state to the liquid state. In essence, the action is a deplating action; and as the metal is converted to the liquid state it will lose its light opacity, thereby permitting viewing of the colored layer 32 at the under face of the support 30. The reaction between the electrolyte 38 and the metal of the portions 34 and 36 of the conductive layer will continue until substantially all of the metal in engagement with that electrolyte has been converted from the solid to the liquid state; and at such time the indicator will stop carrying current. This is important because it means that the "opening" of the electric device will quickly be followed by the "opening" of the circuit.

The overall result is that when a substantial increase occurs in the voltage across the terminals of the electric device, the electrolyte of the indicator will convert a portion of the metal of the conductive layer of that indicator to a liquid form which has little or no light opacity—thereby permitting ready viewing of the colored layer 32 on the under face of the support 30. While the electrolyte is acting upon the metal of the conductive layer, current will flow through the indicator; but that current flow will cease as the portions of the conductive layer in engagement with the electrolyte are converted to the liquid state. The conversion of the metal of the conductive layers from the solid state to the liquid state will provide a striking contrast which will be readily visible to the eye; and, as a result, persons inspecting the indicator will be able to ascertain that the electric device has experienced a change of condition.

It will be noted that the change of the metal of the portions 34 and 36 from the solid state to the liquid state is "irreversible." This is important because it makes certain that persons inspecting the indicator after the electric device has "opened" the circuit will be able to ascertain that the electric device has experienced a change of condition.

Referring to FIGS. 4 and 5, the numeral 42 denotes a plate-like support which can be similar to the plate-like support 30 of FIG. 1. The numeral 44 denotes a layer of material which is affixed to the under face of the support 30; and that layer will preferably have a distinctive and readily visible color. Further, that layer will preferably be made of a material which is substantially unaffected by exposure to the air, is substantially unaffected by heat, and is substantially unaffected by age. The color that is selected should be eye-catching in the environment in which the indicator is to be used.

The numeral 46 denotes one portion of a layer of conductive material that is formed on the upper face of the support 42; and the numeral 48 denotes another portion of that conductive layer. A gap 49 is provided between the confronting faces of the portions 46 and 48, and that gap effectively isolates those portions from each other.

The numeral 50 denotes an electrolyte which is disposed in register with the gap 49 and which overlies small areas of the two portions 46 and 48 of the conductive layer. That electrolyte will preferably be transparent.

A cover 52 has a dome-like portion which overlies the electrolyte 50 and which also extends outwardly to the sides of the portions 46 and 48, as shown particularly by FIG. 5. However, that cover stops short of the outer ends of the portions 46 and 48, as shown particularly by FIG. 4. The cover 52 is intended to protect the electrolyte 50 against accidental removal or displacement; and it is also intended to protect that electrolyte against drying out, exposure to the air, contamination by airborne adulterants, and undesired changes in the composition thereof. The bottom edges of the cover 52 will be suitably sealed to the portions 46 and 48 of the conductive layer and to that portion of the support 42 which is exposed by the gap 49.

The principal difference between the indicator of FIGS. 4 and 5 and the indicator of FIGS. 1–3 is the size of the cover. In FIGS. 1–3, the cover 40 merely overlies the electrolyte 38, whereas in FIGS. 4 and 5 the cover overlies the electrolyte 50 and the greatest part of the upper surfaces of the portions 46 and 48 of the conductive layer. The operation of the indicator of FIGS. 4 and 5 will be substantially the same as the operation of the indicator of FIGS. 1–3.

Referring to FIG. 6, the numeral 54 denotes a plate-like support which can be similar to the plate-like support 30 of FIGS. 1–3. The numeral 56 denotes one portion of a narrow layer of conductive material that is formed on the upper face of the support 54; and the numeral 58 denotes another portion of that narrow conductive layer. The confronting edges of the portions 56 and 58 of the narrow conductive layer are spaced apart by a gap 59; and that gap is large enough to electrically isolate those portions from each other.

The numeral 62 denotes an electrolyte which is disposed in register with the gap 59 and which overlies small areas of the two portions 56 and 58 of the narrow conductive layer. That electrolyte will preferably be transparent.

A cover 60 has a dome-like portion that overlies and accommodates the electrolyte 62. In adidtion, that cover overlies the greatest parts of the upper surfaces of the portions 56 and 58 of the narrow conductive layer, and also overlies large parts of the upper face of the support 54. However, that cover stops short of the sides of the support 54 and also stops short of the outer ends of the portions 56 and 58. The bottom edges of the cover 60 will be suitably sealed to the portions 56 and 58 of the conductive layer and to the support 54.

The indicator of FIG. 6 differs from the indicator of FIGS. 4 and 5 in not having a colored layer on the under face thereof. As long as the electric device with which the indicator of FIG. 6 is associated remains capable of conducting current, the portions 56 and 58 will remain intact and will provide a bright and reflective surface under the dome-like portion of the cover 60. However, whenever that electric device "opens" the circuit, the resulting increased voltage differential between the portions 56 and 58 will cause the electrolyte 62 to convert the confronting ends of those portions from the solid state to the liquid state. The change in appearance of the metal of the portions 56 and 58, as it changes from the solid state to the liquid state, will be very striking and will indicate the change in condition of the electric device with which the indicator of FIG. 6 is associated.

Another difference between the indicator of FIG. 6 and the indicator of FIGS. 4 and 5 is the widths of the portions of conductive layers—the portions 56 and 58 of the conductive layer in FIG. 6 being much narrower than the support 54 whereas the portions 46 and 48 in FIGS. 4 and 5 are as wide as the support 42. Also, the cover 60 in FIG. 6 is slightly narrower than the support 54 whereas the cover 52 in FIGS. 4 and 5 is as wide as the support 42.

FIG. 7 discloses an indicator which has a circular support 64 of dielectric material; and portions 66 and 68 of a conductive layer are formed on the upper face of that support. Each of those portions is semi-circular in plan; and their confronting edges are spaced apart by a gap 69. That gap is wide enough to effectively isolate those portions from each other.

The numeral 70 denotes an electrolyte which is disposed in register with the gap 69 and which overlies small areas of the two portions 66 and 68 of the conductive layer. That electrolyte will preferably be transparent.

A cover 72 has a dome-like portion which overlies and accommodates the electrolyte 70. The cover 72 also overlies and protects the rest of the portions 66 and 68; and the bottom edges of that cover will be suitably sealed to those portions and to that portion of the support 64 which is exposed by the gap 69.

It will be noted that the indicator of FIGS. 7 and 8, like the indicator of FIG. 6, does not have a colored layer on the under face of the support thereof. In the many installations where electrical devices with which indicators are to be associated will be mounted in well-lighted areas, the conversions of the central areas of the portions of the conductive layers from the solid state to the liquid state will give sufficient visual indications of the "opening" of those electric devices. If desired, however, colored layers could, of course, be provided on the under faces of the supports of the indicators of FIG. 6 and of FIGS. 7 and 8.

Referring to FIGS. 9 and 10, the numeral 74 generally denotes a cartridge type electric fuse. That fuse has an inner casing 76; and the outer surface of that casing is engaged and overlain by a sleeve-like layer 78 of electrolyte. A casing 80 is preferably formed from a transparent dielectric material such as glass; and that casing has a portion 82 and a portion 84 of a conductive layer formed at its inner surface. The confronting edges of the portions 82 and 84 are spaced apart by a gap 85; and that gap effectively isolates those portions from each other. The casing 80 is telescoped over the sleeve-like layer 78 of electrolyte on the casing 76, and hence that layer of electrolyte will be in register with the gap 85 and will also engage the portions 82 and 84 of the conductive layer at the inner face of the casing 80.

A ferrule-like terminal 86 is provided at one end of the fuse 74, and a ferrule-like terminal 88 is provided at the other end of that face. Those terminals telescope over the opposite ends of the casing 80. An elongated, readily-fusible element 90 is positioned within the casing 76; and the opposite ends of that fusible element are disposed immediately adjacent the inner faces of the closed ends of the ferrule-like terminals 86 and 88. Solder 92 is provided at each end of the fuse 74; and the solder at the left-hand end electrically interconnects the ferrule-like terminal 86 with the left-hand end of the fusible element 90 and with the portion 82 of the conductive layer. The solder at the right-hand end electrically interconnects the ferrule-like terminal 88 with the right-hand end of the fusible element 90 and with the portion 84 of the conductive layer.

The portions 82 and 84 of the conductive layer will be in the solid state as long as the fusible element 90 is capable of conducting current; and, while in that solid state, those portions will provide a "silvery" appearance for the tubular body portion of the fuse 74. When the fusible element 90 responds to an overload or to a "short" in the circuit of which it is a part, the voltage differential between the portions 82 and 84 will rise sharply; and, thereupon, the electrolyte of the layer 78 will interact with the confronting edges of the portions 82 and 84 to convert them from the solid state to the liquid state. As those confronting edges are converted to the liquid state, they will lose their "silvery" appearance and become substantially transparent—thereby indicating that the fuse 74 has "opened" the circuit.

The extent to which the confronting edges of the portions 82 and 84 of the conductive layer will be changed from the solid state to the liquid state will be a function of the voltage differential between those portions. If that voltage differential is large enough, all of the metal of the portions 82 and 84 will be changed from the solid state to the liquid state; but if that voltage differential is quite small, only a fraction of an inch or so of the confronting edge of each portion 82 or 84 will be changed from the solid state to the liquid state. However, in every instance, enough of the metal of the confronting edge of each portion 82 or 84 will be changed from the solid state to the liquid state to provide a clear indication that the fusible element 90 has "opened" the circuit. As the layer 78 of electrolyte interacts with the metal of the portions 82 and 84 of the conductive layer to change that metal from the solid state to the liquid state, the resistance of those portions will increase. Whether only fractions of inches of the confronting edges of the portions 82 and 84, or all of the portions 82 and 84, are changed from the solid state to the liquid state, the increase in resistance of those portions will be great enough, in view of the voltage differential between those portions, to effectively provide an "open circuit" condition between the terminals 86 and 88.

Referring to FIGS. 11 and 12, the numeral 94 denotes another cartridge type electric fuse. That fuse has a casing 96 which is tubular and which can be light-opaque. This is in contrast to the fuse 74 of FIGS. 9 and 10, wherein the casing 80 is preferably formed from a transparent material. An elongated fusible element 98 is disposed within the casing 96, and the ends of that fusible element will be immediately adjacent the closed ends of ferrule-like terminals 108 and 110 which are telescoped over the opposite ends of the casing 96.

The numeral 100 denotes a plate-like support which has portions 102 and 104 of a conductive layer at the outer face thereof. The adjacent edges of those portions are spaced apart by a gap 105; and that gap is wide enough to electrically isolate those portions from each other. A dome-like cover 106 overlies part of the gap 105 and thereby encloses and protects an electrolyte, not shown, which spans that gap and engages the portions 102 and 104. The electrolyte and the cover 106 can be identical to the electrolyte and cover 38 and 40 of the indicator of FIGS. 1–3. The ferrule-like terminals 108 and 110 will be suitably soldered to the opposite ends of the fusible element 98, and will thereby be in electrically-conducting engagement with that fusible element. The inner faces of those terminals will press intimately against the outer ends of the portions 102 and 104 of the electrically conductive layer, and will thereby make electrical contact with those portions.

As long as the fusible element 98 remains intact, any voltage differential between the portions 102 and 104 of the conductive layer will be too small to cause the electrolyte to act upon those portions. However, whenever that fusible element "opens" to protect the circuit in which the fuse 94 is connected, the voltage differential between the portions 102 and 104 will increase and will cause the electrolyte to interact with those portions 102 and 104 to change part of the confronting edges of those portions from the solid state to the liquid state.

While those portions are in the solid state, they will give the appearance of a substantially continuous "silvery" strip that extends axially of the casing 96 of the fuse 94. However, after parts of the confronting edges of those portions have been converted from the solid state to the liquid state, those portions will no longer give the appearance of a substantially continuous "silvery" strip but, instead, will give an interrupted appearance. The contrast between the continuous "silvery" appearance that is normally provided by the portions 102 and 104 and the interrupted appearance that is provided by those portions when parts of the adjacent edges of those portions are converted to the liquid state will be striking. Hence the "opening" of the fusible element 98 can be readily ascertained by a visual inspection of the indicator at the exterior of the fuse 94.

Referring to FIGS. 13–17, the numeral 112 generally denotes a plug type electric fuse. That fuse has a hollow body 114 with screw threads thereon; and that body and those screw threads can be made from porcelain or other suitable insulating material. A resilient terminal 116 is suitably secured to the body 114 adjacent the upper end of the screw thread on that body, and a terminal 118 is suitably secured to that body adjacent the lower end of that screw thread. A fusible element 120 has the right-hand end thereof connected to the terminal 118 and has the left-hand end thereof connected to terminal 116 by a conductor 122 which extends to and is connected with the terminal 116. The fusible element 120 can be of standard and usual design and is not, per se, a part of the present invention.

An extension 124 is provided on the left-hand end of the fusible element 120, and that extension is formed to have a J-shaped configuration, as shown particularly by FIG. 14. A flat disc-like support 126 is formed so it will fit into the recess defined by the J-shaped portion of the extension 124; and that support can be of any suitable dielectric material. A cup-like closure 132, of a transparent dielectric material, is in register with, but is spaced outwardly of, the support 126. The numeral 128 denotes one portion of a conductive layer that is formed on the right-hand or under face of the closure 132, and the numeral 130 denotes a second portion of that conductive layer. The adjacent edges of the portions 128 and 130 are spaced apart by a gap 131 and that gap is wide enough and deep enough to electrically isolate the said portions from each other. If desired, the under face of the support 126 can be provided with a layer or coating which is colored to have a distinctive, eye-catching appearance.

The numeral 133 denotes a layer of electrolyte which will preferably be transparent, and which spans the gap 131 and engages the portions 128 and 130. That electrolyte is overlain and protected by the closure 132 and is underlain and protected by the support 126.

The numeral 135 denotes a conductor which has the right-hand end thereof connected to the terminal 118 and which has a J-shaped configuration at the left-hand end thereof. That J-shaped configuration will enable the left-hand end of that conductor to accommodate the edge of the disc-like support 126. That J-shaped portion will be enclosed by the closure 132; and a metal cap 134 of standard and usual design can be used to hold the closure 132 in assembled relation with the body 114. The J-shaped portions of the extension 124 and of the conductor 135 will, respectively, engage the portions 130 and 128 of the conductive layer.

As long as the fusible element 120 of the fuse 112 is in its normal condition, that fusible element and the conductor 122 will provide a low resistance, current-conducting path between the terminals 116 and 118 of that fuse. Also, the conductor 122, the J-shaped extension 124 of the fusible element 120, the portion 130 of the conductive layer, the electrolyte 133, the portion 128 of the conductive layer, and the conductor 135 will provide a higher resistance current-conducting path between those terminals. This means that as long as the fusible element 120 remains intact, substantially no current will flow through the current-conducting path which includes conductor 122, J-shaped extension 124, portion 130, electrolyte 133, portion 128, and conductor 135. However, when the fusible element 120 "opens" to open the circuit protected by the fuse 112, a substantial voltage differential will be established between the portions 128 and 130; and the electrolyte 133 will respond to that voltage differential to convert the adjacent edges of the portions 128 and 130 from the solid state to the liquid state. As those adjacent edges are converted from the solid state to the liquid state, they will lose their "silvery" appearance and thereby indicate that the fusible element 120 has "opened." Moreover, where a colored layer is provided at the under face of the disc-like support 126, the change of the adjacent edges of the portions 128 and 130 from the solid state to the liquid state will cause that colored layer to become visible. That layer will be particularly helpful in indicating the "opening" of the fusible element 120 where the fuse 112 is mounted in a place that is poorly lighted.

Where the fusible element 120 "opens" to protect an A.C. circuit, the adjacent edges of both of the portions 128 and 130 will be changed from the solid state to the liquid state, as indicated particularly by FIG. 15. However, where that fusible element "opens" to protect a D.C. circuit, only one of the portions of the conductive layer will have its free edge changed from the solid state to the liquid state, as indicated particularly by FIGS. 16 and 17. The principal difference between the fuses shown in FIGS. 16 and 17 is that they have "blown" in circuits with opposite polarities.

It is preferable, in the various forms of indicators shown by FIGS. 1–8, that the electrolytes be transparent; because a transparent electrolyte permits the portions of the conductive layer to normally give the conductive layer the appearance of being substantially continuous. However, where desired, those electrolytes could be translucent or even light-opaque as long as those electrolytes were capable of interacting with the portions of the conductive layers to provide readily visible and distinctive changes in the appearance of the indicator as those electrolytes coacted with those portions to convert the adjacent edges of those portions from the solid state to the liquid state.

It is preferable that the electrolytes, in the various forms of indicators, engage substantially equal areas of the adjacent portions of the conductive layers. Where that is done, substantially uniform patterns will be provided by the adjacent portions of the conductive layers when the indicators operate to indicate "opening" of the electric devices with which they are associated, if those electric devices are parts of A.C. circuits. Such uniform patterns are very desirable where colored layers underlie the supports and become visible when the adjacent edges of the portions of the transparent layers are changed from the solid state to the liquid state.

The changing of the portions of the conductive layers from the solid state to the liquid state must be irreversible, so it will be detectable after the circuit has been "opened." By making the action of the electrolyte and the portions of the conductive layers comparable to a de-plating action, the requisite irreversible nature of the action is assured.

In the various indicators of FIGS. 1–17, the outer ends of the spaced portions of the conductive layers will serve as the terminals of those indicators. Those terminals can be connected to the terminals of electric devices to place those indicators in parallel with those electric devices; and FIGS. 9–17 illustrate three ways in which the terminals of indicators can be connected to the terminals of electric devices to place those indicators in parallel with those electric devices.

Where an indicator is associated with an electric fuse, the normal voltage differential across the gap between the portions of the conductive layer of that indicator will be quite small—usually being less than a volt and one half. Under such circumstances, the gap between the portions of the conductive layer can be quite narrow—in the range of a few thousandths of an inch. However, where the indicator is to be connected in parallel with an electric device which has a greater resistance than does a fuse, the gap should be widened to keep the electrolyte from interacting with the portions of the conductive layer despite a larger voltage differential between those portions.

The indicator provided by the present invention can be connected in parallel with different kinds of electric devices to promptly and fully indicate "opening" of those devices if those devices are connected in circuits wherein a surge in voltage or an increase in voltage, that exceeds the decomposition voltage of the electrolyte, occurs when the electric device "opens." The indicator will be made so it has a gap that is sufficiently wide to keep the electrolyte from interacting with the portions of the conductive layer as long as the electric device is capable of conducting current, but will cause that electrolyte to respond to the increase in voltage differential between the portions of that conductive layer, as that electric device "opens," to convert the adjacent edges of the said portions from the solid state to the liquid state.

The spaced portions of the conductive layers of the indicators of FIGS. 1-17 are preferably formed from aluminum; because that metal is relatively inexpensive, is readily applied, and has a high degree of reflectivity. Further, where desired, aluminum can be anodized to have different degrees of reflectivity and to have different colors. By appropriately coloring the spaced portions of a conductive layer of an indicator, it is possible to enable the changing of the confonting edges of those portions, from the solid state to the liquid state, to provide a clearly visible indication of the "opening" of the electric device with which that indicator is associated. While aluminum is preferred, silver, copper, nickle, zinc, cadmium, and other readily electroplated metals could be used.

In FIGS. 1-3, 11 and 12, large areas of the spaced portions of the conductive layers are exposed. In actual practice, as indicated by FIGS. 4-10 and 13-17, most of the areas of the spaced portions of the conductive layers are overlain and covered. This is desired in protecting users from electrical shocks, and is also desirable in protecting those spaced portions from injury.

Where an indicator is to be used to indicate the "opening" of an electric device, that is part of an A.C. circuit, a conductive layer with two spaced-apart portions is not essential. Instead, one of the portions of the conductive layer can be replaced by a conductor which either is thick enough or is otherwise able to remain in the solid state when the conductive layer is changed to the liquid state. With such an indicator, the electrolyte would engage the said conductor and the conductive layer, but only the conductive layer would change from the solid to the liquid state. Actually, however, the use of a conductive layer with two spaced-apart portions is more desirable because such a layer provides a larger visual indication of the "opening" of the said electric device.

Whereas the drawing and accompanying description have shown and described several preferred embodiments of the present invention it should be apparent to those skilled in the art that various changes may be made in the form of the invention without affecting the scope thereof.

What I claim is:

1. An indicator, for an electric fuse, which can respond to "opening" of said electric fuse to provide a visual indication of said "opening" of said electric fuse and which comprises:
   (a) an electric fuse,
   (b) a support of transparent dielectric material,
   (c) a portion of a conductive layer on one face of said support,
   (d) a second portion of said conductive layer on said face of said support,
   (e) said portions of said conductive layer being spaced apart by a gap which is large enough and deep enough to electrically isolate said portions of said conductive layer,
   (f) said portions of said conductive layer being formed of metal,
   (g) a layer of colored material at the opposite face of said support,
   (h) said portions of said conductive layer normally overlying and concealing said layer of colored material from view, whereby said indicator normally has the appearance provided by said portions of said conductive layer,
   (i) said conductive layer having a thickness in the order of millionths of an inch,
   (j) an electrolyte that is disposed in register with said gap and that engages substantially equal areas of said portions of conductive layer,
   (k) said electrolyte being conductive,
   (l) said electrolyte being non-corrosive relative to said portions of said conductive layer,
   (m) said electrolyte being substantially unaffected by age,
   (n) said electrolyte being substantially unaffected by the ambient temperatures to which said electric fuse is subject, and,
   (o) a cover for said electrolyte,
   (p) said cover having a dome-like portion to accommodate and confine said electrolyte,
   (q) said cover having the bottom edges thereof sealed to said portions of said conductive layer and to that portion of said support which is exposed by said gap,
   (r) said dome-like portion of said cover being transparent,
   (s) said portions of said conductive layer being connected to the terminals of said electric fuse,
   (t) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
   (u) said electrolyte responding to the voltage differential between said terminals of said electric fuse, when said electric fuse "opens," to change the confronting edges of said portions of said conductive layer from the solid state to the liquid state,
   (v) said change of said confronting edges of said portions of said conductive layer from the solid state to the liquid state materially altering the appearance of said portions of said conductive layer and also exposing part of said layer of colored material to view, thereby enabling said indicator to provide a visual indication of the opening of said electric fuse.

2. An indicator, for an electric fuse, which can respond to "opening" of said electric fuse to provide a visual indication of said "opening" of said electric fuse and which comprises:
   (a) an electric fuse,
   (b) a support of transparent dielectric material,
   (c) a portion of a conductive layer on one face of said support,
   (d) a second portion of said conductive layer on said face of said support,
   (e) said portions of said conductive layer being spaced apart by a gap which can electrically isolate said portions of said conductive layer,
   (f) a layer of colored material at the opposite face of said support,
   (g) said portions of said conductive layer normally overlying and concealing said layer of colored material from view, whereby said indicator normally has the appearance provided by said portions of said conductive layer,
   (h) an electrolyte that is disposed in register with said gap and that engages said portions of said conductive layer,
   (i) said electrolyte being conductive,
   (j) a cover for said electrolyte,
   (k) said portions of said conductive layer being connected to the terminals of said electric fuse,
   (l) said electrolye being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current, (m) said electrolyte responding to the voltage differential between said terminals of said electric fuse, when said electric fuse "opens," to change the confronting edges of said portions of said conductive layer from the solid state to the liquid state, (n) said change of said confronting edges of said portions of said conductive layer from the solid state to the liquid state materially altering the appearance of said portions of said conductive layer and also exposing part of said layer of colored material to view, thereby enabling said indicator to provide a visual indication of the opening of said electric fuse.

3. An indicator, for an electric fuse, which can respond to "opening" of said electric fuse to provide a visual indication of said "opening" of said electric fuse and which comprises:

(a) an electric fuse,
(b) a support of transparent dielectric material,
(c) a portion of conductive layer on one face of said support,
(d) a second portion of said conductive layer on said face of said support,
(e) said portions of said conductive layer being spaced apart by a gap which can electrically isolate said portions of said conductive layer, and
(f) an electrolyte that is disposed in register with said gap and that engages said portions of said conductive layer,
(g) said portions of said conductive layer being connected to the terminals of said electric fuse,
(h) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
(i) said electrolyte responding to the voltage differential between said terminals of said electric fuse, when said electric fuse "opens," to change the confronting edges of said portions of said conductive layer from the solid state to the liquid state,
(j) said change of said confronting edges of said portions of said conductive layer from the solid state to the liquid state materially altering the appearance of said portions of said conductive layer, thereby enabling said indicator to provide a visual indicating of the opening of said electric fuse.

4. An indicator, for an electric fuse, which can respond to "opening" of said electric fuse to provide a visual indication of said "opening" of said electric fuse and which comprises:

(a) an electric fuse,
(b) a portion of conductive layer which is normally in the solid state but which will respond to an appreciable flow of electric current therethrough in the presence of an electrolyte to electrolytically change to the liquid state,
(c) a second portion of said conductive layer,
(d) said portions of said conductive layer being spaced apart by a gap which can electrically isolate said portions of said conductive layer, and
(e) an electrolyte that is disposed in register with said gap and that engages said portions of said conductive layer and that will respond to an appreciable flow of electric current through said portions of said conductive layer to electrolytically change the confronting edges of said portions from the solid state to the liquid state,
(f) said portions of said conductive layer being connected to the terminals of said electric fuse,
(g) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
(h) said electrolyte responding to the voltage differential between said terminals of said electric fuse, when said electric fuse "opens," to change the confronting edges of said portions of said conductive layers from the solid state to the liquid state,
(i) said change of said confronting edges of said portions of said conductive layer from the solid state to the liquid state materially altering the appearance of said portions of said conductive layer.

5. An indicator, for an electric fuse, which can respond to "opening" of said electric fuse to provide a visual indication of said "opening" of said electric fuse and which comprises:

(a) an electric fuse,
(b) a portion of conductive layer which is normally in the solid state but which will respond to an appreciable flow of electric current therethrough in the presence of an electrolyte to electrolytically change to the liquid state,
(c) a second portion of said conductive layer,
(d) said portions of said conductive layer being spaced apart, and
(e) an electrolyte that engages said portions of said conductive layer and that will respond to an appreciable flow of electric current through said portions of said conductive layer to electrolytically change the confronting edges of said portions from the solid state to the liquid state,
(f) said portions of said conductive layer being connected to the terminals of said electric fuse,
(g) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
(h) said electrolyte responding to the voltage differential between said terminals of said electric fuse, when said electric fuse "opens," to change the confronting edges of said portions of said conductive layers from the solid state to the liquid state, thereby enabling said indicator to provide a visual indication of the "opening" of said electric fuse.

6. An indicator, for an electric device, which can respond to "opening" of said electric device to provide a visual indication of said "opening" of said electric device and which comprises:

(a) an electric device,
(b) terminals which can be connected to said electric device and which are normally in one state and which will respond to an appreciable flow of current therethrough in the presence of an electrolyte to electrolytically change to a visually different state to enable said indicator to sense changes in the condition of said electric device, and
(c) an electrolyte which is in electrically-conducting relation with said terminals and which will respond to an appreciable flow of electric current through said terminals to cause the confronting edges of said terminals to electrolytically change from said one state to said second state,
(d) said electrolyte being substantially insensitive to any voltage differentials between said terminals as long as said electric device is capable of conducting current, thereby enabling said indicator to have a predetermined appearance as long as said electric device is capable of conducting current,
(e) said electrolyte responding to the voltage differential between said terminals, and to the resulting appreciable flow of electric current through said terminals when said electric device "opens," to cause the confronting edges of said terminals to electrolytically change from said one state to said second state and thus materially alter said predetermined appearance of said indicator, thereby enabling said indicator to provide a visual indication of the "opening" of said electric device.

7. An indicator, for an electric device, which can respond to "opening" of said electric device to provide a visual indication of said "opening" of said electric device and which comprises:
 (a) an electric device,
 (b) a mass of colored material,
 (c) a layer that is normally in the solid state and that normally overlies and conceals said mass of colored material,
 (d) said layer having portions thereof connected to the terminals of said electric device which respond to an appreciable flow of current therethrough in the presence of an electrolyte to electrolytically change to the liquid state, and
 (e) an electrolyte which will respond to an appreciable flow of electric current through said portions of said layer to cause parts of said portions of said layer to electrolytically change from said solid state to the liquid state,
 (f) said layer being substantially insensitive to any voltage differentials between said terminals of said electric device as long as said electric device is capable of conducting current, thereby enabling said layer to remain in the solid state and conceal said mass of colored material,
 (g) said layer and said electrolyte responding to the voltage differential between said terminals, and to the resulting appreciable current flow through said portions of said layer when said electric device "opens," to electrolytically change parts thereof from said solid state to the liquid state and expose said mass of colored material, thereby enabling said indicator to provide a visual indication of the "opening" of said electric device.

8. An indicator, for an electric device, which can respond to "opening" of said electric device to provide a visual indication of said "opening" of said electric device and which comprises:
 (a) an electric device,
 (b) a layer that is readily visible as long as it is in the solid state and that in normally in the solid state,
 (c) said layer being connected to said electric device to enable said indicator to sense changes in the condition of said electric device, and
 (d) an electrolyte in engagement with said layer,
 (e) said layer and said electrolyte being substantially insensitive to any voltage differentials between the terminals of said electric device as long as said electric device is capable of conducting current, thereby enabling said layer to remain in the solid state to give said indicator a predetermined appearance as long as said electric device is capable of conducting current,
 (f) said layer and said electrolyte responding to the voltage differential between said terminals, and to the resulting appreciable current flow through said portions of said layer when said electric device "opens," to electrolytically change part of said layer from said solid state to the liquid state, thereby enabling said indicator to provide a visual indication of the "opening" of said electric device.

9. An indicator, for an electric fuse, which can respond to "opening" of said electric fuse to provide a visual indication of said "opening" of said electric fuse and which comprises:
 (a) an electric fuse,
 (b) a portion of a conductive layer which is normally in the solid state but which will respond to an appreciable flow of electric current therethrough in the presence of an electrolyte to electrolytically change to the liquid state,
 (c) a second portion of said conductive layer,
 (d) said portions of said conductive layer being spaced apart, and
 (e) an electrolyte that engages said portions of said conductive layer and that will respond to an appreciable flow of electric current through said portions of said conductive layer to electrolytically change the confronting edges of said portions from the solid state to the liquid state,
 (f) said portions of said conductive layer being connected to the terminals of said electric fuse,
 (g) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
 (h) said electrolyte responding to the voltage differential between said terminals of said electric fuse, when said electric fuse "opens," to change the confronting edges of said portions of said conductive layer from the solid state to the liquid state, thereby enabling said indicator to provide a visual indication of the opening of said electric fuse,
 (i) said electric fuse being a plug type electric fuse and having said portions of said conductive layer adjacent the outer end thereof so they are visible.

10. An indicator, for an electric fuse, which can respond to "opening" of said electric fuse to provide a visual indication of said "opening" of said electric fuse and which comprises:
 (a) an electric fuse,
 (b) a portion of a conductive layer which is normally in the solid state but which will respond to an appreciable flow of electric current therethrough in the presence of an electrolyte to electrolytically change to the liquid state,
 (c) a second portion of said conductive layer,
 (d) said portions of said conductive layer being spaced apart, and
 (e) an electrolyte that engages said portions of said conductive layer and that will respond to an appreciable flow of electric current through said portions of said conductive layer to electrolytically change the confronting edges of said portions from the solid state to the liquid state,
 (f) said portions of said conductive layer being connected to the terminals of said electric fuse,
 (g) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
 (h) said electrolyte responding to the voltage differential between said terminals of said electric fuse, when said electric fuse "opens," to change the confronting edges of said portions of said conductive layer from the solid state to the liquid state, thereby enabling said indicator to provide a visual indication of the opening of said electric fuse,
 (i) said electric fuse being a plug type electric fuse and having said portions of said conductive layer adjacent the outer end thereof so they are visible, and
 (j) a colored layer that underlies and is normally concealed by said portions of said conductive layer,
 (k) said colored layer being visible when said confronting edges of said portions of said conductive layer are changed from the solid state to the liquid state.

11. An indicator, for an electric fuse, which can respond to "opening" of said electric fuse to provide a visual indication of said "opening" of said electric fuse and which comprises:
 (a) an electric fuse,
 (b) a portion of a conductive layer which is normally in the solid state but which will respond to an appreciable flow of electric current therethrough in the presence of an electrolyte to electrolytically change to the liquid state,
 (c) a second portion of said conductive layer,
 (d) said portions of said conductive layer being spaced apart, and
 (e) an electrolyte that engages said portions of said conductive layer and that will respond to an appreciable flow of electric current through said portions of said conductive layer to electrolytically change the confronting edges of said portions from the solid state to the liquid state,
 (f) said portions of said conductive layer being connected to the terminals of said electric fuse,
 (g) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
 (h) said electrolyte responding to the voltage differential between said terminals of said electric fuse, when said electric fuse "opens," to change the confronting edges of said portions of said conductive layer from the solid state to the liquid state, thereby enabling said indicator to provide a visual indication of the opening of said electric fuse,
 (i) said electric fuse being a cartridge type electric fuse that has a transparent casing with said portions of said conductive layer at the inner face of said casing.

12. An indicator, for an electric fuse, which can respond to "opening" of said electric fuse to provide a visual indication of said "opening" of said electric fuse and which comprises:
 (a) an electric fuse,
 (b) a portion of a conductive layer which is normally in the solid state but which will respond to an appreciable flow of electric current therethrough in the presence of an electrolyte to electrolytically change to the liquid state,
 (c) a second portion of said conductive layer,
 (d) said portions of said conductive layer being spaced apart, and
 (e) an electrolyte that engages said portions of said conductive layer and that will respond to an appreciable flow of electric current through said portions of said conductive layer to electrolytically change the confronting edges of said portions from the solid state to the liquid state,
 (f) said portions of said conductive layer being connected to the terminals of said electric fuse,
 (g) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
 (h) said electrolyte responding to the voltage differential between said terminals of said electric fuse, when said electric fuse "opens," to change the confronting edges of said portions of said conductive layer from the solid state to the liquid state, thereby enabling said indicator to provide a visual indication of the opening of said electric fuse,
 (i) said electric fuse being a cartridge type electric fuse that has a transparent casing with said portions of said conductive layer at the inner face of said casing, and
 (j) a second casing that is spaced inwardly of said transparent casing and that encloses the fusible element of said electric fuse,
 (k) said electrolyte being disposed between said casings.

13. An indicator, for an electric fuse, which can respond to "opening" of said electric fuse to provide a visual indication of said "opening" of said electric fuse and which comprises:
 (a) an electric fuse,
 (b) a portion of a conductive layer which is normally in the solid state but which will respond to an appreciable flow of electric current therethrough in the presence of an electrolyte to electrolytically change to the liquid state,
 (c) a second portion of said conductive layer,
 (d) said portions of said conductive layer being spaced apart, and
 (e) an electrolyte that engages said portions of said conductive layer and that will respond to an appreciable flow of electric current through said portions of said conductive layer to electrolytically change the confronting edges of said portions from the solid state to the liquid state,
 (f) said portions of said conductive layer being connected to the terminals of said electric fuse,
 (g) said electrolyte being substantially insensitive to any voltage differentials between said terminals of said electric fuse as long as said electric fuse is capable of conducting current, thereby enabling said indicator to have the appearance provided by said portions of said conductive layer as long as said electric fuse is capable of conducting current,
 (h) said electrolyte responding to the voltage differential between said terminals of said electric fuse, when said electric fuse "opens," to change the confronting edges of said portions of said conductive layer from the solid state to the liquid state, thereby enabling said indicator to provide a visual indication of the opening of said electric fuse,
 (i) said electric fuse being a cartridge type electric fuse,
 (j) said portions of said conductive layer being disposed at the exterior of the casing of said electric fuse.

References Cited by the Examiner
UNITED STATES PATENTS

| | | | |
|---|---|---|---|
| 851,751 | 4/07 | Hoffman | 200—121 |
| 1,087,120 | 2/14 | Hooker | 200—121 |
| 1,623,666 | 4/27 | Ferkel | 73—356 |
| 2,971,852 | 2/61 | Schulein | 116—114 |

BERNARD A. GILHEANY, *Primary Examiner.*